United States Patent
Billig

(10) Patent No.: US 7,206,683 B2
(45) Date of Patent: Apr. 17, 2007

(54) CONTROL DEVICE FOR AN AT LEAST PARTIALLY FOUR-WHEEL-DRIVEN VEHICLE

(75) Inventor: Christian Billig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/336,934

(22) Filed: Jan. 23, 2006

(65) Prior Publication Data

US 2006/0122033 A1    Jun. 8, 2006

Related U.S. Application Data

(63) Continuation of application No. PCT/EP2004/008091, filed on Jul. 17, 2004.

(30) Foreign Application Priority Data

Jul. 24, 2003    (DE)    ................... 103 33 653

(51) Int. Cl.
   *F16D 48/12*    (2006.01)
   *G06F 19/00*    (2006.01)
(52) U.S. Cl. ................ 701/69; 701/67; 701/70; 192/54.1; 180/247
(58) Field of Classification Search .............. 701/67, 701/68, 69, 70; 192/54.1; 180/247, 248; 477/171, 179, 181
See application file for complete search history.

(56) References Cited

U.S. PATENT DOCUMENTS

| | | | | |
|---|---|---|---|---|
| 4,860,208 A | * | 8/1989 | Bantle | 701/69 |
| 4,912,638 A | * | 3/1990 | Pratt, Jr. | 701/69 |
| 5,152,362 A | | 10/1992 | Naito | |
| 6,719,656 B2 | * | 4/2004 | Bowen | 475/5 |
| 2003/0216215 A1 | * | 11/2003 | Suzuki et al. | 477/5 |

FOREIGN PATENT DOCUMENTS

| | | |
|---|---|---|
| DE | 3427725 A1 | 8/1985 |
| DE | 3721628 A1 | 1/1988 |
| DE | 4011214 A1 | 10/1990 |
| DE | 10054023 A1 | 5/2002 |
| DE | 10161892 A2 | 7/2002 |
| EP | 0538504 A1 | 4/1993 |

OTHER PUBLICATIONS

International Search Report for PCT/EP2004/008091 dated Aug. 10, 2004.
German Examination Report for 103 33 653.2-51.

* cited by examiner

*Primary Examiner*—Tan Q. Nguyen
(74) *Attorney, Agent, or Firm*—Crowell & Moring LLP

(57) ABSTRACT

In the case of a control device for an at least partially four-wheel-driven motor vehicle, having a control unit which can variably distribute the driving torque of a drive unit to primary driving wheels, which are permanently connected with the drive unit, and to secondary driving wheels which, if required, can be connected by way of a transfer clutch with the drive unit, in that the control unit determines a desired clutch torque which is to be set by means of an actuator device at the transfer clutch, the control unit receives at least one input signal for detecting an accelerator pedal position and is further developed such that, when the desired clutch torque is determined, a basic pilot control fraction is taken into account, which is defined as a function of the accelerator pedal position and is corrected as a function of additional parameters which are detected or determined by the control unit.

19 Claims, 2 Drawing Sheets

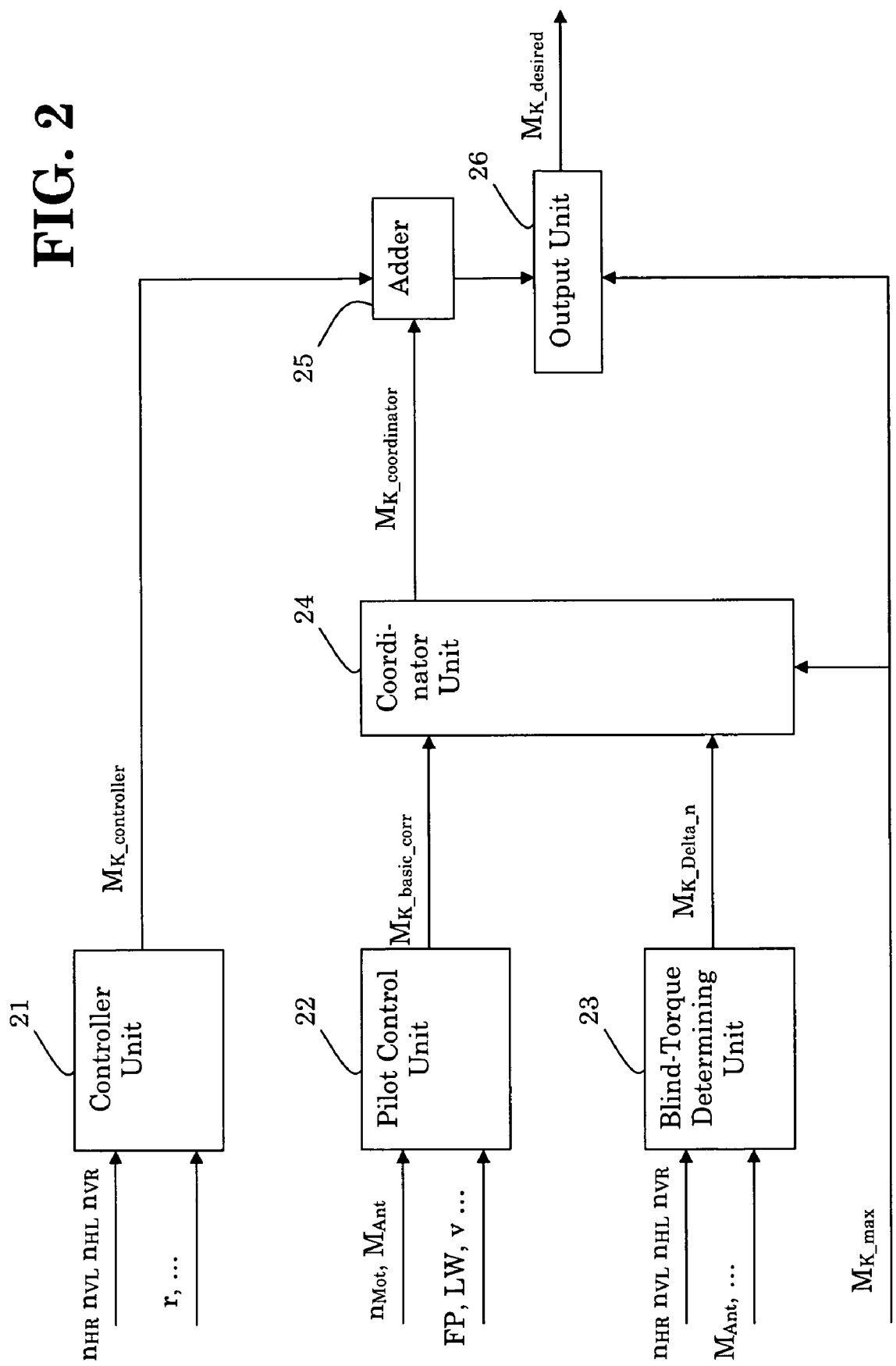

CONTROL DEVICE FOR AN AT LEAST PARTIALLY FOUR-WHEEL-DRIVEN VEHICLE

CROSS-REFERENCE TO RELATED APPLICATIONS

The present application is a continuation of International Patent Application No. PCT/EP2004/008091, filed Jul. 17, 2004, and claims priority under 35 U.S.C. § 119 to German Application No. 103 33 653.2-51, filed Jul. 24, 2003. The entire disclosure of the aforementioned documents is herein expressly incorporated by reference. This application contains subject matter which is related to the subject matter contained in application Ser. Nos. 11/336,922, 11/336,933, 11/336,925, and 11/337,047 filed on even date herewith.

BACKGROUND AND SUMMARY OF THE INVENTION

The present invention relates to a control device for an at least partially four-wheel-driven motor vehicle. More particularly, the present invention relates to a control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch.

A control device of this type is described, for example, in German Patent Document DE 100 54 023 A1. Accordingly, a torque distribution device is known for changing the torque distribution ratio between the wheels of the front axle and the wheels of the rear axle by a corresponding control of a friction clutch as a longitudinal blocking device (e.g., transfer clutch). The driving action of a vehicle can be influenced considerably by the determination of a torque distribution ratio. In particular, the object of German Patent Document DE 100 54 023 A1 relates to the driving dynamics when cornering. In this case, a partially four-wheel-driven motor vehicle may be a basically front-wheel-driven motor vehicle with a rear-wheel drive which can be connected by means of a transfer clutch; a basically rear-wheel-driven motor vehicle with a front-wheel drive which can be connected by way of a transfer clutch; or a permanent all-wheel drive vehicle with a controllable transfer clutch for changing the torque distribution between the front and rear axle.

In general, as discussed below, primary driving wheels are the wheels which are permanently connected with the drive unit, and secondary driving wheels are the wheels which, if required, can be connected with the drive unit by way of the transfer clutch.

Furthermore, such known control systems usually have a control of the transfer clutch as a function of the rotational speed difference between a rotational speed of the primary driving axle and the rotational speed of the secondary driving axle (for example, German Patent Document DE 34 27725 C2).

It is an object of the present invention to improve a control system of the previously mentioned type with respect to the precision of the control.

The present invention is based on the recognition that, in the case of an all-wheel drive torque distribution, the driver's intention is important and usually relates to high or considerably changing power demands while the traction is optimal. For this reason, particularly the accelerator pedal position and also the change of the accelerator pedal position may be taken into account. Simultaneously, but to a lesser degree, the limits of the traction optimization may also be taken into account. These are defined by driving situations or vehicle conditions by which a twisting of the transmission line is caused. In this case, it may be taken into account that twisting occurs, particularly when cornering or when maneuvering into or out of parking spaces (depending on the steering angle), but also in the case of large rotational wheel speed differences (depending on blind torques) (for example, as a result of different tire circumferences). It is also important in the case of the control device according to the invention that the long-term component protection with respect to mechanical wear and temperature-caused stress are taken into account (depending on the vehicle speed and the driving torque). Finally, in addition, comfort is also increased, particularly when starting (depending on the rotational engine speed).

Other objects, advantages and novel features of the present invention will become apparent from the following detailed description of the invention when considered in conjunction with the accompanying drawings.

BRIEF DESCRIPTION OF THE DRAWINGS

FIG. 2 illustrates an exemplary embodiment of a control unit, in accordance with the present invention.

DETAILED DESCRIPTION OF THE DRAWINGS

Figure 1:
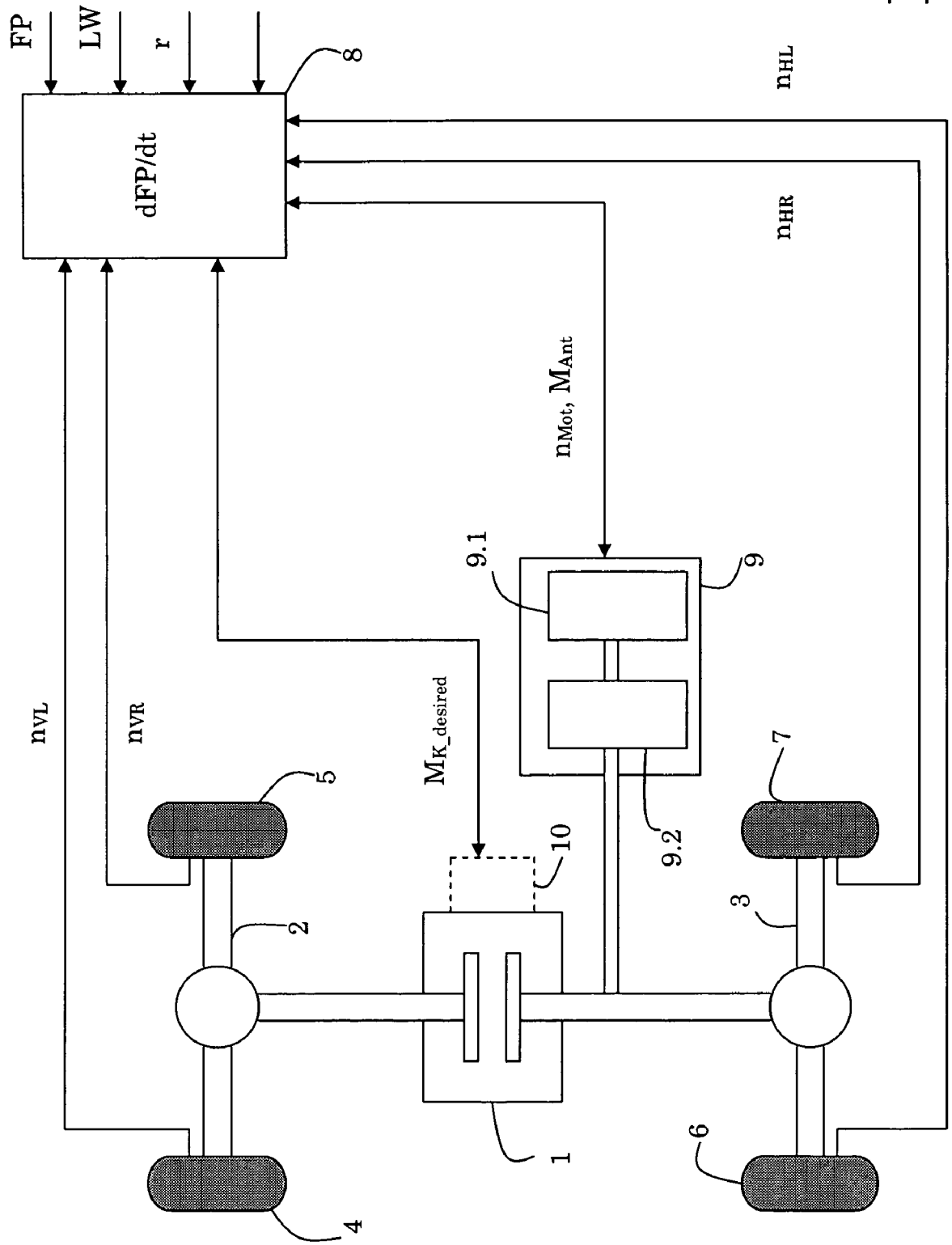
FIG. 1 is a schematic view of a partially four-wheel-driven vehicle with a transfer clutch, which can be adjusted by way of a control unit, on the example of a basically rear-wheel-driven motor vehicle with a front-wheel drive which can be connected by way of a transfer clutch.

FIG. 1 illustrates a partially four-wheel-driven vehicle in the form of a basically rear-wheel-driven motor vehicle with a front wheel drive which, if required, can be connected by way of a transfer clutch 1. The transfer clutch 1 can be adjusted by means of a control unit 8. The control unit 8 may contain an outside-disposed (for example, mounted directly on the transfer clutch 1) additional control device 10 which, for example, converts the defined desired clutch torque to electric current for controlling the adjusting unit (not shown here) of the transfer clutch 1.

In the case of a vehicle according to FIG. 1, while the transfer clutch 1 is open, the entire torque (driving torque) of the drive unit 9 is transferred to the wheels 6 and 7 of the rear axle 3. The drive unit 9 may include an internal-combustion engine 9.1, a transmission 9.2, and at least one drive control device (not shown here in detail). The drive control device communicates, for example, by way of the known motor vehicle data bus CAN with the control unit 8. In FIG. 1, the rear wheels 6 and 7 are the primary driving wheels, because they are permanently connected with the drive unit 9. As the clutch torque at the transfer clutch 1 increases, the drive unit 9 also drives the wheels 4 and 5 of the front axle 2. The front wheels 4 and 5 are, therefore, the secondary driving wheels.

In addition to other input signals, the control unit 8, in particular, may detect an input signal for detecting the position of an accelerator pedal, for example, the operating angle FP of the so-called accelerator pedal. From the latter, the control unit 8 determines the speed of the operation of the accelerator pedal dFP/dt. Furthermore, the control unit 8 may detect or determine the rotational engine speed $n_{mot}$, the engine torque (=internal-combustion engine torque) or the driving torque $M_{Ant}$ (=transmission-output-side cardan shaft torque), the steering angle LW, the yaw rate or yaw angle rate r, and the rotational wheel speeds $n_{VL}$, $n_{HL}$, $n_{VR}$, and $n_{HR}$ of all wheels 4, 5, 6, and 7, respectively. From these rotational wheel speeds $n_{VL}$, $n_{HL}$, $n_{VR}$, and $n_{HR}$, in connection with other information present in the control unit 8, the wheel speeds $v_{VL}$, $v_{HL}$; $v_{VR}$, and $v_{HR}$ of all wheels 4, 5, 6, and 7, respectively, as well as the vehicle speed v may be determined.

For the distribution of the driving torque of the drive unit 9, a clutch torque $M_{K\_desired}$ to be adjusted is defined for the transfer clutch 1 arranged between the drive unit 9 or the primary driving wheels 6 and 7 and the secondary driving wheels 4 and 5. In an exemplary embodiment, the control unit 8 emits the desired clutch torque $M_{K\_desired}$ to the additional control device 10. The additional control device 10 may convert the desired clutch torque $M_{K\_desired}$ to a current for controlling the actuator device, not shown here separately.

FIG. 2 shows additional details of an exemplary embodiment of the control unit 8.

While taking into account the wheel slip and quantities of driving dynamics, such as an oversteering or an understeering, a control fraction $M_{K\_controller}$ relating to driving dynamics is determined in the controller unit 21 for determining the desired clutch torque $M_{K\_desired}$.

In the pilot control unit 22, the corrected basic pilot control fraction $M_{K\_basic\_corr}$ is determined and may be emitted to a coordinator unit 24. In a blind-torque determining unit 23, a wheel-slip-related blind torque $M_{K\_Delta\_n}$ can be determined and can also be emitted to the coordinator unit 24. Blind torques are interference torques which may lead to a twisting of the transmission line, for example, as a result of different tire circumferences. The blind torque $M_{K\_Delta\_n}$ may be determined as a function of the wheel speeds, the engine or driving torque, the vehicle weight and tire tolerance factors. The blind-torque determining unit 23 and/or the coordinator unit 24 may be present in exemplary embodiments of the controller 8 of the present invention. The pilot control unit 22 can also be connected directly with the adder 25.

The output torque $M_{K\_coordinator}$ of the coordinator unit 24, which usually corresponds to the corrected basic pilot control fraction $M_{K\_basic\_corr}$, is transmitted to the adder 25. In the adder 25, the adding-up of the output torque $M_{K\_coordinator}$ of the coordinator unit 24 and the control fraction $M_{K\_control}$ related to driving dynamics takes place. In the output unit 26, the desired clutch torque $M_{K\_desired}$ to be actually set is finally determined and may be emitted to the additional control device 10 (compare FIG. 1).

When determining the desired clutch torque $M_{K\_desired}$, the control unit 8 may take into account the basic pilot control fraction $M_{K\_basic}$ which is defined as a function of the accelerator pedal position FP in the pilot control unit 22, for example, in the form of a characteristic curve. As a function of additional parameters, which the control unit detects or determines, the basic pilot control fraction $M_{K\_basic}$ may be changed to a corrected basic pilot control fraction $M_{K\_basic\_corr}$.

As another parameter, the speed of the accelerator pedal operation dFP/dt is determined in the pilot control unit 22. As the speed of the accelerator pedal operation increases, that is, with a rising steepness of the gradient of the accelerator pedal change, the basic pilot control fraction $M_{K\_basic}$ is increased, for example, by a defined load change offset $M_{K\_Grad}$.

Furthermore, the rotational engine speed nmot may be detected as another parameter in the pilot control unit 22. As the rotational engine speed nmot increases, the basic pilot control fraction $M_{K\_basic}$ is increased, for example, by a defined rotational speed offset $M_{K\_n}$.

In addition, the steering angle LW may be detected as a further parameter in the pilot control unit 22. As the steering angle LW increases, the basic pilot control fraction $M_{K\_basic}$ is reduced, for example, by a defined steering angle offset $M_{K\_LW}$.

Also, the driving torque $M_{Ant}$ may be detected as another parameter in the pilot control unit 22. As the driving torque $M_{Ant}$ increases, the basic pilot control fraction $M_{K\_basic}$ is increased, for example, by a defined torque offset $M_{K\_M}$.

Furthermore, the vehicle speed v may be determined in the pilot control unit 22 as another parameter. As the vehicle speed v increases, the basic pilot control fraction $M_{K\_basic}$ is reduced, for example, by a defined vehicle speed offset $M_{K\_v}$. As an alternative, as a function of defined vehicle speed ranges (such as the starting range of 0–40 km/h, the normal range of 40–180 km/h, the high-speed range of >180 km/h), maximally permissible basic pilot control fractions (for example, $M_{K\_v\_max1}$, $M_{K\_v\_max2}$, $M_{K\_v\_max3}$) can also be defined, in which case the vehicle-speed-dependent maximally permissible basic pilot control fraction is reduced as the vehicle speed v increases.

The desired clutch torque $M_{K\_desired}$ to be set may be determined by the control unit 8, basically by adding up the corrected basic pilot control fraction $M_{K\_basic\_desired}$ (standard pilot control) and a driving-dynamics-related control fraction $M_{K\_controller}$, unless another rule obtains a higher priority, for example, by the coordinator unit 24 or by the output unit 26. The output unit 26 receives as an input signal, which may be from the additional control device 10, a maximally permissible limit torque $M_{K\_max}$ defined by the degree of stress to the actuator device. This limit torque $M_{K\_max}$ can also be taken into account in the coordinator unit 24.

The corrected basic pilot control fraction $M_{K\_basic\_corr}$ may therefore be obtained by:

$$M_{K\_basic\_corr} = M_{K\_basic} + M_{K\_Grad} + M_{K\_n} - M_{K\_LW} - M_{K\_v}$$

or (depending on the vehicle speed range) by:

$$M_{K\_basic\_corr} = \mathrm{MIN}\,((M_{K\_basic} + M_{K\_Grad} + M_{K\_n} - M_{K\_Lw}), (M_{K\_v\_max1}; M_{K\_v\_max2}; M_{K\_v\_max3}))$$

Thus, the desired clutch torque $M_{K\_desired}$ may be obtained by:

$$M_{K\_desired} = M_{K\_basic\_corr} - M_{K\_Delta\_n} + M_{K\_controller}$$

and can, however, in addition, be reduced by the maximally permissible limit torque $M_{K\_max}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein a first additional parameter is a speed of accelerator pedal operation, and wherein, as the speed of the accelerator operation increases, the basic pilot control fraction increases.

2. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit.

wherein a first additional parameter is a rotational engine speed, and wherein the basic pilot control fraction increases as the rotational engine speed increases.

3. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein a first additional parameter is a steering angle, and wherein the basic pilot control fraction decreases as the steering angle increases.

4. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein a first additional parameter is an engine torque or a driving torque, and wherein the basic pilot control fraction increases as the engine torque or driving torque increases.

5. A control device according to claim 4, wherein a second additional parameter is a steering angle, and wherein the basic pilot control fraction decreases as the steering angle increases.

6. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein a first additional parameter is a vehicle speed, and wherein the basic pilot control fraction decreases as the vehicle speed increases, or the basic pilot control fraction is limited to a vehicle-speed-dependent maximally permissible basic pilot control fraction which decreases as the vehicle speed increases.

7. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein the desired clutch torque to be set is determined by the control unit by adding up the corrected basic pilot control fraction and a driving-dynamics-related control fraction.

8. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein the desired clutch torque to be set is determined by the control unit while taking into account a maximally permissible limit torque defined by a degree of stress to the actuator device.

9. A control device for an at least partially four-wheel-driven motor vehicle, having a control unit which variably distributes a driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, wherein the control unit receives at least one input signal for detecting an accelerator pedal position and, when the desired clutch torque is determined, a basic pilot control fraction is taken into account, which is defined as a function of the accelerator pedal position and is corrected as a function of additional parameters which are detected or determined by the control unit, wherein the desired clutch torque to be set is determined by the control unit while taking into account a wheel-slip-related blind torque.

10. A control device according to claim 1, wherein a second additional parameter is a rotational engine speed, and wherein the basic pilot control fraction increases as the rotational engine speed increases.

11. A control device according to claim 1, wherein a second additional parameter is a steering angle, and wherein the basic pilot control fraction decreases as the steering angle increases.

12. A control device according to claim 1, wherein a second additional parameter is an engine torque or a driving torque, and wherein the basic pilot control fraction increases as the engine torque or driving torque increases.

13. A control device according to claim 1, wherein a second additional parameter is a vehicle speed, and wherein the basic pilot control fraction decreases as the vehicle speed increases, or the basic pilot control fraction is limited to a vehicle-speed-dependent maximally permissible basic pilot control fraction which decreases as the vehicle speed increases.

14. A control device according to claim 1, wherein the desired clutch torque to be set is determined by the control unit by adding up the corrected basic pilot control fraction and a driving-dynamics-related control fraction.

15. A control device according to claim 1, wherein the desired clutch torque to be set is determined by the control unit while taking into account a maximally permissible limit torque defined by a degree of stress to the actuator device.

16. A control device according to claim 1, wherein the desired clutch torque to be set is determined by the control unit while taking into account a wheel-slip-related blind torque.

17. A control device according to claim 2, wherein a second additional parameter is a steering angle, and wherein the basic pilot control fraction decreases as the steering angle increases.

18. A control device according to claim 2, wherein a second additional parameter is an engine torque or a driving torque, and wherein the basic pilot control fraction increases as the engine torque or driving torque increases.

19. A control device according to claim 2, wherein a second additional parameter is a vehicle speed, and wherein the basic pilot control fraction decreases as the vehicle speed increases, or the basic pilot control fraction is limited to a vehicle-speed-dependent maximally permissible basic pilot control fraction which decreases as the vehicle speed increases.

* * * * *